United States Patent [19]

Romanowski

[11] 3,960,017

[45] June 1, 1976

[54] THERMOMETER INSERTABLE IN WINDING OF FLUID COOLED TRANSFORMER

[75] Inventor: Robert F. Romanowski, Rochester, N.Y.

[73] Assignee: Qualitrol Corporation, Fairport, N.Y.

[22] Filed: Feb. 10, 1975

[21] Appl. No.: 548,350

[52] U.S. Cl. ........................... 73/349; 73/350;
  73/362 R; 73/363.3; 250/231 R
[51] Int. Cl.² ............... G01K 1/14; G01K 5/52;
  G01K 13/02
[58] Field of Search ............ 73/339 R, 349, 350,
  73/362 R, 363, 363.1, 363.3; 250/231

[56] References Cited
  UNITED STATES PATENTS

| | | | |
|---|---|---|---|
| 2,197,190 | 4/1940 | Mott-Smith | 73/362 R X |
| 3,580,082 | 5/1971 | Strack | 73/406 |
| 3,611,791 | 10/1971 | Wilbur | 73/339 R X |
| 3,686,958 | 8/1972 | Porter et al. | 73/406 |
| 3,691,501 | 9/1972 | Katchka et al. | 73/363 X |
| 3,789,667 | 2/1974 | Porter et al. | 73/406 |

FOREIGN PATENTS OR APPLICATIONS 599,578  11/1949  United Kingdom .................. 73/349

*Primary Examiner*—James J. Gill
*Assistant Examiner*—Frederick Shoon
*Attorney, Agent, or Firm*—Stephen J. Rudy

[57] ABSTRACT

A thermometer formed wholly of dielectric components inserted between the coils of a transformer winding immersed in cooling fluid within the case of a high voltage transformer, the thermometer having a rod responsive to temperature changes within the case to vary light transmission across terminals of a pair of fiber optics to an external signal converter connected to transmit converted signals to a readout unit.

The body of the thermometer may take various forms according to the applications intended. In applications not requiring dielectric components, the body and sensing rod may each be formed of a different metal, with that of the body having a lower coefficient of thermal expansion than that of the other.

5 Claims, 11 Drawing Figures

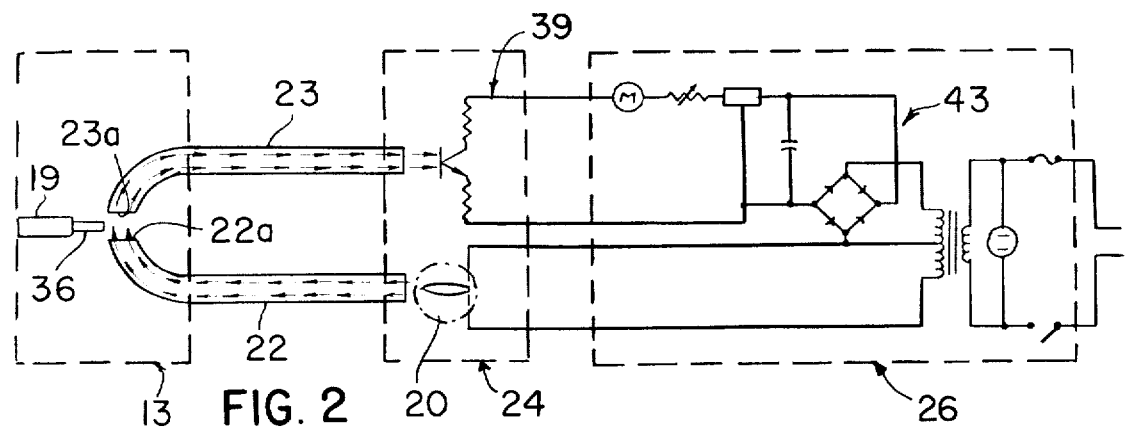
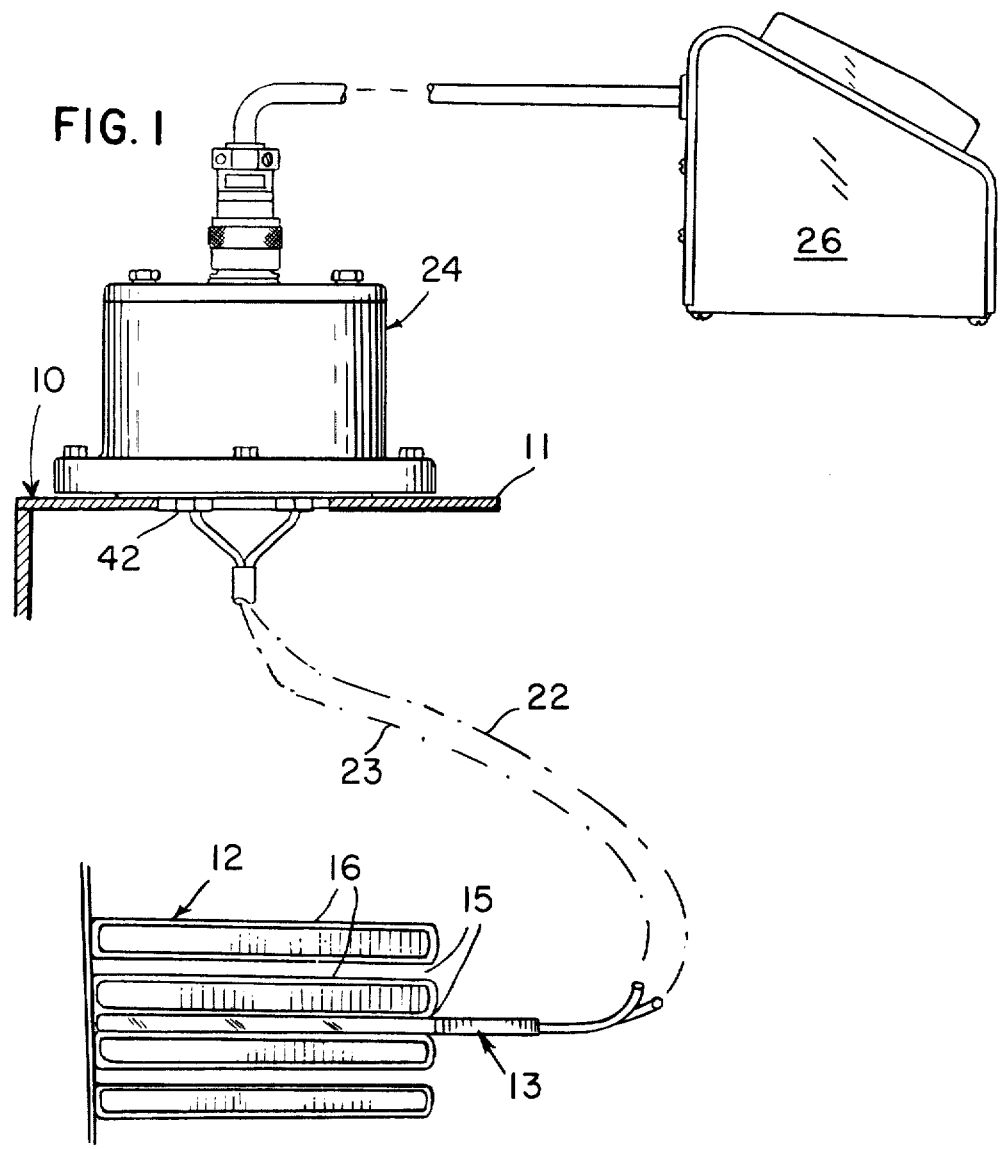

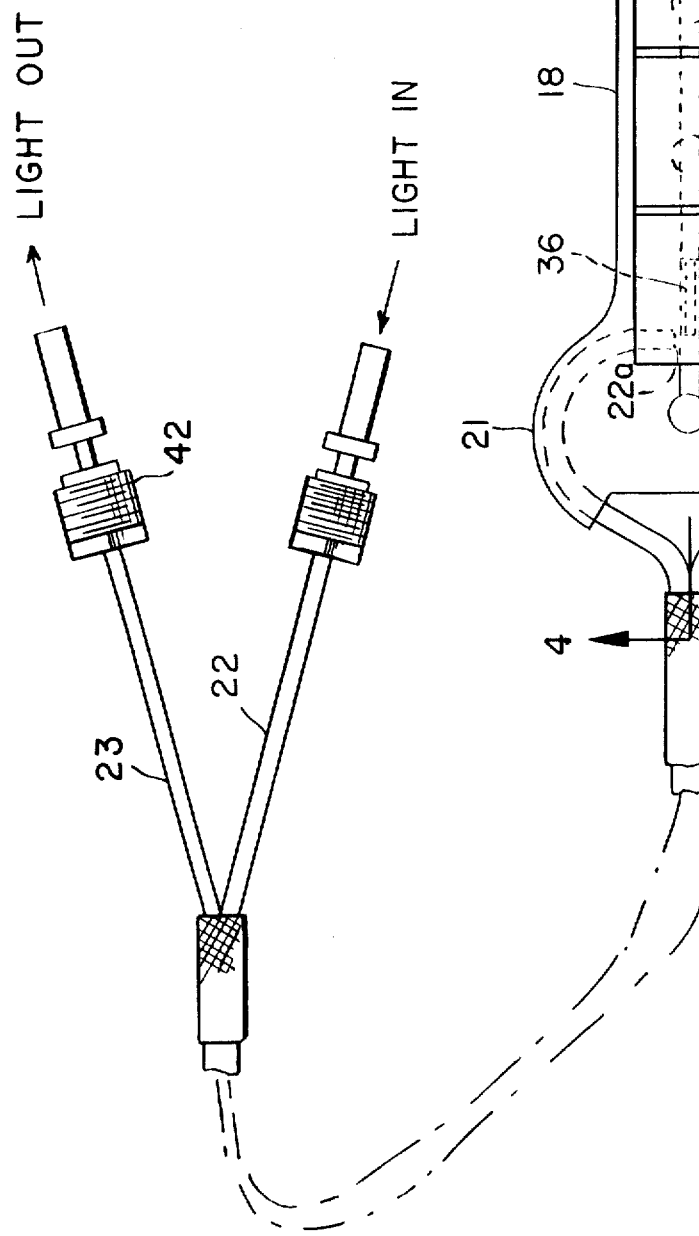

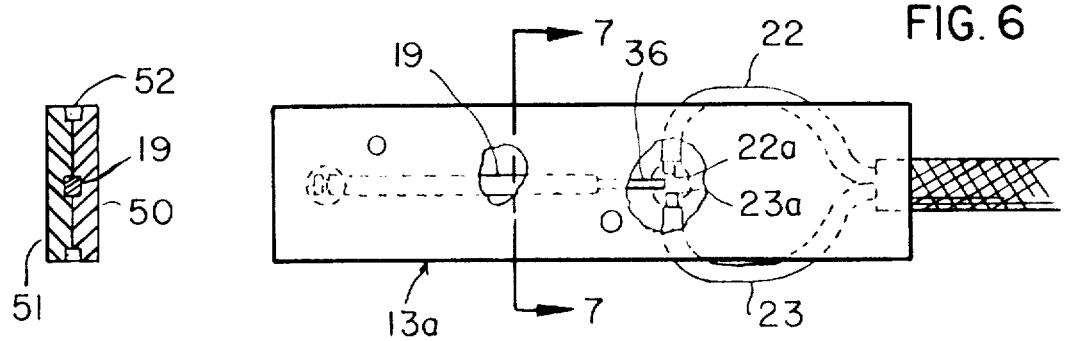
FIG. 6
FIG. 7
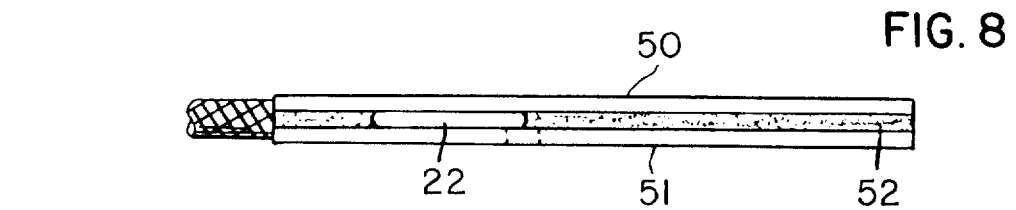
FIG. 8
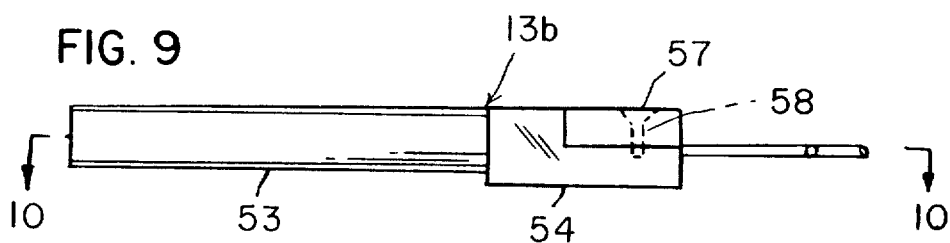
FIG. 9
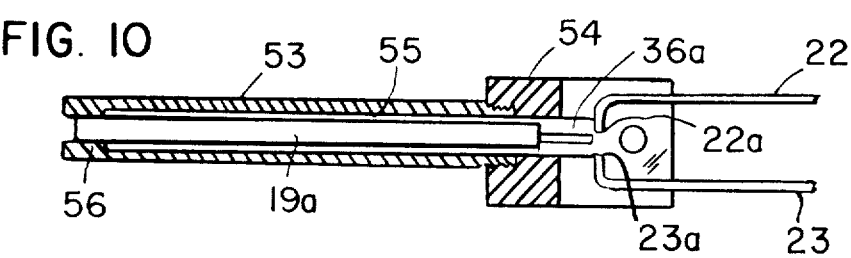
FIG. 10
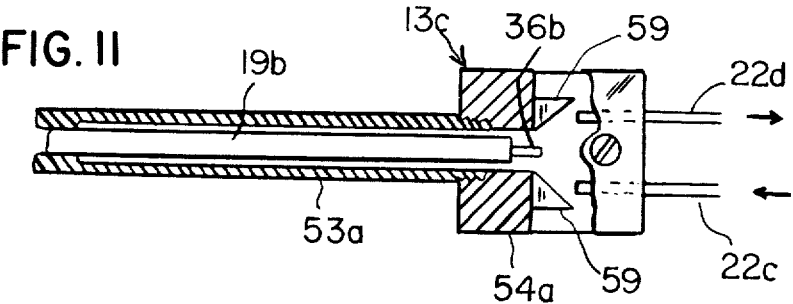
FIG. 11

THERMOMETER INSERTABLE IN WINDING OF FLUID COOLED TRANSFORMER

BACKGROUND OF THE INVENTION

This invention is concerned with a thermometer instrument for use in sensing temperature changes in a fluid cooled electrical transformer and causing a signal corresponding to the change to be transmitted to an external indicator.

It has been found that when a temperature change in an electrical transformer exceeds a certain value for any appreciable period of time, the life of the transformer decreases rapidly. The indicator which reflects the temperature change may be informative to an attendant to take appropriate protective steps to control the operation of the transformer; or it may include automatically operable signal responsive control devices to this end.

It has been found that the hottest spot develops in the winding of the transformer. Accordingly, the thermometer should be associated with the winding for greater accuracy and rapidity in sensing any developing temperature changes that may prove harmful to the transformer if unduly continued.

However, problems are presented to the association of a thermometer with a transformer winding. The design of high voltage transformers is such that it is impractical to utilize in the winding any type of temperature sensing means having a metallic component. The introduction of a metallic element to the winding will result in distortion of the electrical flux path with a resultant reduction in transformer efficiency. These transformers presently operate above ground at very high potential so that no conductive material, such as a thermo-couple or other sensing device, can be utilized in the winding or connected to the transformer case. Connections between the sensing device and the case of the transformer must also be of a dielectric material to prevent a fault to ground in the transformer winding.

The general objective of the present invention is to provide a thermometer for sensing temperature changes in a fluid cooled electrical transformer which may be inserted in the winding of the transformer without developing the foregoing problems.

A further objective of the present invention is to provide a thermometer which may be inserted in the winding of a fluid cooled electrical transformer and which may be connected through the case of the transformer to suitable signal indicating means.

BRIEF DESCRIPTION OF THE DRAWING

In the accompanying drawing:

FIG. 1 is a view showing a fluid cooled electrical transformer with the winding of which a thermometer embodying the invention is associated and is connected with external signal reproduction means for indicating temperature changes sensed by the thermometer;

FIG. 2 is a circuit diagram of the association of the thermometer with the external signal reproduction means;

FIG. 3 is a top plan view of the thermometer;

FIG. 4 is a section taken on line 4—4 of FIG. 3;

FIG. 5 is a section taken on line 5—5 of FIG. 3;

FIG. 6 is a top plan of a modified form of the thermometer shown in FIG. 3;

FIG. 7 is a section taken on line 7—7 of FIG. 6;

FIG. 8 is a view in side elevation of the thermometer shown in FIG. 6;

FIG. 9 is a view in side elevation of a further modified form of the thermometer;

FIG. 10 is a section on line 10—10 of FIG. 9; and

FIG. 11 is a view partly in section of a further modified form of the thermometer.

DESCRIPTION OF PREFERRED EMBODIMENT OF THE INVENTION

In the drawing is disclosed a conventional high voltage fluid cooled electrical transformer unit 10 having the usual case 11 containing cooling fluid in which the transformer winding 12 is immersed. Only so much of the transformer is shown as is needed to explain the invention.

A temperature sensing instrument or thermometer 13 embodying the invention is shown in FIG. 1 as applied to the winding of the transformer. It has been slidably inserted with a close or friction fit into one of the usual spaces 15 separating the coils 16 of the winding.

The thermometer, as appears in FIGS. 3–5, includes a body of key-form having a stem portion 18 containing a temperature or heat sensing element 19. At the rear of the stem is a head portion 21 in which terminal ends of a pair of fiber optics or light pipes 22, 23 are disposed with their end faces 22a and 23a in opposed spaced relation to each other.

The sensing element 19 is adapted in response to changes in temperature within the transformer to correspondingly expand or contract linearly relative to and between the terminal end faces of the light pipes so as to vary light flow from a source 20 across the terminals to a connected conventional light signal converter 24. The latter is mounted upon an external wall surface of the transformer case 11.

The converter responds to variations in the value of the light signal normally received through the light pipes to transmit an electrical signal of corresponding value to a conventional indicator or readout unit 26. The converted signal is made visible and intelligible in conventional manner on a screen of the readout unit to an attendant for such action as he may deem expedient relative to the operating condition of the transformer. The readout unit is also adapted to have connected to it suitable alarm or control devices which will respond automatically to a signal of certain value to sound a warning or regulate further operation of the transformer.

All components of the thermometer are made of dielectric material so as to avoid any distortion in the electrical flux path through the winding and the consequent reduction in the efficiency of the transformer that would otherwise occur if the components included any metallic elements.

The body of the thermometer is made of ceramic material which enables it to withstand the high temperature than can develop within the transformer. It has opposed upper and lower parallel flat surfaces 27, 28. The thickness of the body corresponds substantially to the vertical dimension or height of the space 15 between the coils 16 of the winding so that it may be slidably inserted into the space with a close or friction fit, as indicated in FIG. 1.

Recessed in the upper surface 27 of the body is an elongated channel or slot 29. The slot begins proximate the forward end of the stem, extends centrally of the latter, and terminates at about the middle of the head portion 21.

The sensing element 19 is a nylon plastics rod which has been slidably or loosely entered into the slot. The forward end of the rod is anchored fast to the thermometer body by means of a suitable dielectric cement filling a cross hole at 30. The opposite end is unsecured or free.

So as to limit the rod to essentially linear expansion and contraction in response to temperature changes, the rod is confined to the slot by the sides of the slot and by means of an overlying cover, generally referenced 31. The upper surface 27 of the body of the thermometer is further recessed (FIG. 5) to receive the cover in such manner that the surface of the cover is co-planar or flush with the corresponding surface of the body. A suitable dielectric cement 32 fixes the cover in place.

The cover comprises a succession of sections 33 spaced slightly one from the other, as at 34. The spaces serve to expose the sensing rod and slot to direct contact and flooding by the transformer fluid. A small portion of the slot extends and opens from the head of the thermometer beyond the cover, as at 35; and its purpose is to ensure direct exposure of the free end 36 of the sensing rod to the transformer fluid. To further ensure greater contact and circulation of the transformer fluid about the free end of the sensing rod and also to obtain a greater sensitivity of the free end of the rod, the free end is reduced relative to the slot and to the main body of the rod.

A series of cross holes 37 communicating through the body of the thermometer with the slot also serve to directly expose the rod and slot to the transformer fluid. Fluid from the tank passing through the several openings in the body of the thermometer to the slot completely fills the latter about the sensing rod. This arrangement whereby the sensing rod is directly exposed to and fully immersed in the transformer fluid results in direct application to the rod of the heat developing in the fluid from the winding. Further, the various openings communicating with the slot enable the transformer fluid to circulate or move in and out of the slot over the sensing rod.

Recessed in the upper face of the head portion of the thermometer body is a pair of oppositely located curved grooves 38 which open at one end into a notch 41 at the rear of the head. They open at their opposite ends in intersecting perpendicular relation to the slot at a point just rearwardly of or proximate the free end 36 of the sensing rod.

A terminal portion of each of the light pipes 22, 23 is seated in a separate one of the grooves and cemented in place. The terminal end faces 22*a* and 23*a* of the light pipes directly face one another from opposite sides of the slot.

The light pipe 22 extends out of the notched end 41 of the thermometer body and passes through the transformer case into the housing of the converter 24 where it is arranged to receive flow of light from the light source or lamp 20. The other light pipe 23 extends out of the notched end 41 and passes through the transformer case into the converter where it is arranged to transmit flow of light received from pipe 22 to a light responsive electrical circuit 39. Sleeve nuts 42 engaged with the housing of the converter secure the light pipes in place. The circuit 39 responds according to the value of light being applied to it to produce an electrical signal of corresponding value in a connected readout circuit 43 of the readout unit 26.

The sensing rod is adapted in response to heat changes of predetermined value developing in the transformer fluid to expand or contract in the slot relative to the end faces of the light pipes. As the rod is caused to expand, it extends linearly into the intersection between the end faces of the light pipes to reduce the flow of light across the end faces to the converter; and as the rod is caused to retract from its expanded position, the flow of light across the end faces increases. The signal produced in the readout circuit varies in intensity according to the value of light flow across the light pipes to the converter and, accordingly, indicates the temperature condition within the transformer.

THE EMBODIMENT IN FIGS. 6–8

The embodiment shown in FIGS. 6–8 discloses a thermometer 13*a* having a body comprising a pair of mating ceramic panels 50 and 51 of elongated rectangular configuration cemented together. The cement 52 fills a common groove formed about the opposed edges of the panels. The terminal portions of the fiber optics 22, 23 are securely confined in place between the panels with their respective end faces 22*a*, 23*a* in proper opposed spaced relation to each other and proximate or just beyond the free end 36 of the sensing rod element 19.

The embodiments described in FIGS. 1–8 are designed primarily for a special application (as indicated) with respect to the winding of an electrical transformer, and to this end their several components are of dielectric material to ensure against interference with the electrical operating efficiency of the transformer.

However, a thermometer of this general nature, characterized by a heat expandable sensing rod for varying light flow from one fiber optic to another for transmittal to a light responsive indicator, has some other applications in which it is desirable to provide electrical insulation (as by means of the fiber optic elements) between the thermometer or point of measurement and the light responsive indicator. Examples of such other applications are the measuring of the temperature of a metallic conductor operating at a high voltage, or the measuring of the temperature of oil being pumped into a transformer case about a high voltage winding.

These other applications do not require that the body or housing of the thermometer or the sensing rod be of non-metallic material. In such applications, the body may be a metallic material having a lower coefficient of heat expansion than that of the sensing rod. For example, the body may be formed of some metal, such as aluminum, to provide rapid heat transfer to the plastics sensing rod. Or the body and the sensing rod may both be formed of metal where the coefficient of thermal expansion of the body is lower than that of the sensing element. In each of these applications, the fiber optics are used to conduct to the indicating instrument a light signal as varied in its intensity by the expanding action of the heat sensing rod.

Further, while the form of the body of the thermometer shown in FIGS. 1–8 is of generally flat form for insertion between the narrowly spaced coils of the transformer winding, in other applications the body may take the form deemed suitable for the occasion (as indicated in FIGS. 9–11).

FIG. 9 EMBODIMENT

In FIGS. 9–10 is disclosed a modified form which the thermometer may take which is suitable for use in the other applications mentioned above. The body or housing of the thermometer 13b, while it may be of various configurations, is shown here as having a tubular portion 53 which is threadedly connected with an axially disposed enlarged head or block portion 54.

The tubular portion has a central channel 55 in which the sensing rod 19a is slidably received. The rear end 56 of the sensing rod is fixed to the tubular portion, and its reduced opposite free end 36a extends into an axial opening in the head portion 54. The terminal ends of the fiber optics 22, 23 are secured in place within the head portion with their face ends 22a, 23a in opposed spaced relation to each other proximate or just beyond the free end 36a of the sensing rod. The position of the terminal ends of the fiber optics are fixed by an overlying cover 57 portion of the head. The cover is secured in place in suitable manner as by a screw 58.

In the embodiment, the sensing rod is formed of a metal, such as aluminum; and the housing 53, 54 is formed of a metal, such as invar, which has a relatively lower coefficient of thermal expansion.

FIG. 11 EMBODIMENT

In the FIG. 11 embodiment, the housing or body of the thermometer 13c has a tubular portion 53a retaining the sensing rod 19b, and has an attached head 54a provided with an axial opening into which the free end 36b of the sensing rod protrudes.

In this embodiment, a pair of oppositely disposed spaced prisms 59, confined within the head portion of the housing, are employed to transfer light from one fiber optic 22c to the other 22d, and the free end of the sensing rod is disposed so as to move upon expansion between the opposed angled faces of the prisms 59 to cut off or reduce the intensity of the light moving from the one fiber optic to the other.

To this end, the fiber optic 22c is associated at one end with a light source; and its other end is angularly disposed in close spaced relation to the face of one of the prisms. The other fiber optic 22d has its light receiving end disposed angularly in close spaced relation to the face of the other prism, and its opposite end connected with a light responsive instrument, such as a photo-sensing device.

Light passing through fiber optic 22c upon impinging against the face of one prism 59 is reflected to and from the face of the other prism into the fiber optic 22d.

The materials of which the body and sensing rod are formed should be compatible with the environment in which the thermometer will be used, such as the nature of the fluids in which they may be immersed, as well as the range of the temperature to be measured. Similarly, the limits of temperature, (about 600° F) should be considered when using the thermometer to avoid damaging the fiber optics and possibly other components. Also, the body of the thermometer should be of a material having a lesser coefficient of thermal expansion than that of which the sensing rod is formed.

I claim:

1. The combination comprising an electrical transformer apparatus having a tank containing cooling fluid in which the coils of a transformer winding are immersed, a thermometer having a body of ceramic dielectric material inserted in a space between the coils, a dielectric heat sensing rod of plastics material disposed within a channel internally of the body having one end fixed to the latter and the other end free, a pair of light pipes of fiber optic dielectric material each having one terminal end face disposed in the body in opposed spaced relation to that of the other proximate the free end of the sensing rod, the sensing rod being responsive to heat of a predetermined value developing within the cooling fluid to expand linearly relative to the channel to project its free end between the said terminal end faces of the light pipes, a light signal electrical converter device located externally of the tank, each light pipe having a second terminal end extending externally of the tank, one of said second terminal ends being connected with a light source and the other being connected with a light signal responsive circuit in the converter, and a signal read-out unit connected with the light signal responsive circuit.

2. The combination as in claim 1, wherein the body has parallel flat opposed upper and lower surfaces and a thickness enabling the body to be slidably received in the space between the coils of the transformer winding.

3. A thermometer for sensing changes in the value of heat developing in an associated medium, comprising a body insertable into the medium, a heat sensing rod disposed internally of the body, a pair of fiber optic light conduits each having a face at one terminal end disposed in the body in opposed spaced relation to that of the other and proximate a free end of the sensing rod, the sensing rod being responsive to heat of the medium of a predetermined value to expand linearly relative to the body to project its free end between the said end faces of the conduits, a second terminal end of one of the conduits being associated with a source of light, and a second terminal end of the other conduit being associated with a light signal responsive device.

4. A thermometer for sensing changes in the value of heat developing within the winding of an electrical transformer immersed in a cooling fluid within a tank, the thermometer comprising a body of ceramic dielectric material adapted to be inserted into a space between coils of the winding, a heat sensing rod of dielectric plastics material disposed within a channel provided internally of the body, the rod having one end fixed to the body and the other end free, a pair of fiber optic light conduits each having a first terminal end face disposed within the body in opposed spaced relation to that of the other proximate a free end of the sensing rod, a second terminal end of one of the conduits located externally of the body being connectible with a source of light, a second terminal end of the other conduit located externally of the body being connectible with a light signal responsive device, the body having openings through its surface communicating with the channel and with the sensing rod, and the sensing rod being responsive to heat of a predetermined value to expand linearly in the channel so as to project its free end between the said first terminal end faces of the conduits.

5. A thermometer as in claim 4, wherein the body has a head portion and an elongated stem portion extending linearly from the head portion, the stem and head portions having opposed upper and lower parallel flat surfaces, the conduits entering the body through the head portion, and the stem portion being insertable into the space between the coils of the winding.

* * * * *